United States Patent [19]

Lang et al.

[11] Patent Number: 4,760,498

[45] Date of Patent: Jul. 26, 1988

[54] PHOTOGRAPHIC LAMP

[75] Inventors: Joseph Lang, Blotzheim, France; Armin Nuessli, Rodersdorf, Switzerland

[73] Assignee: Bron Elektronik AG, Allschwil, Switzerland

[21] Appl. No.: 914,494

[22] Filed: Oct. 2, 1986

[30] Foreign Application Priority Data

Oct. 3, 1985 [DE] Fed. Rep. of Germany ....... 3535293

[51] Int. Cl.$^4$ ............................................. G03B 15/02
[52] U.S. Cl. .................... 362/17; 362/301; 362/302; 362/298; 362/346
[58] Field of Search ............ 362/3, 16, 17, 296, 362/297, 298, 300, 302, 341, 346, 301, 303, 305; 355/71; 354/413, 126, 370, 296; 350/311, 314

[56] References Cited

U.S. PATENT DOCUMENTS

| | | | |
|---|---|---|---|
| 2,286,219 | 6/1942 | Martinek | 350/314 |
| 2,879,377 | 3/1959 | Layng | 354/126 |
| 3,111,274 | 11/1963 | Turano | 362/17 |
| 3,253,504 | 5/1966 | Vollmer | 362/302 |
| 3,397,023 | 8/1968 | Land | 354/227 |
| 3,878,385 | 4/1975 | Kingston | 362/17 |
| 4,298,275 | 11/1981 | Critchlow et al. | 354/296 |

FOREIGN PATENT DOCUMENTS 3124757 2/1983 Fed. Rep. of Germany ...... 362/296

*Primary Examiner*—Ira S. Lazarus
*Assistant Examiner*—D. M. Cox
*Attorney, Agent, or Firm*—Foley & Lardner, Schwartz, Jeffery, Schwaab, Mack, Blumenthal & Evans

[57] ABSTRACT

A photographic lamp possessing a main and back-reflector which are located respectively behind and in front of a light source. The main reflector limits a light exit aperture which is closed by a diffuser screen. The back-reflector comprises a transparent base which is partly provided with a reflecting layer. The reflecting layer is preferably applied in the manner of a graduated filter, so that the reflecting points are more numerous in the center of the base and less frequent at its periphery. The light produced is thereby extremely even and the illumination is very even, avoiding dark areas on the diffuser screen.

12 Claims, 1 Drawing Sheet

U.S. Patent  Jul. 26, 1988  4,760,498
Fig.1
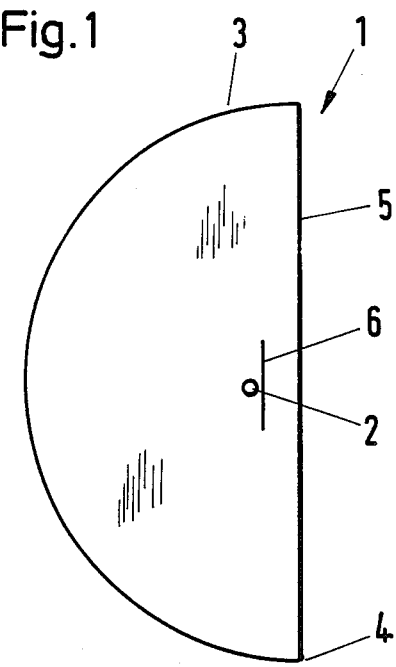
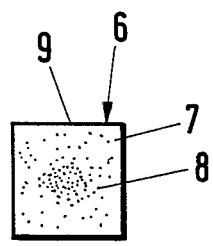
Fig. 2

PHOTOGRAPHIC LAMP

BACKGROUND OF THE INVENTION

The invention relates to a photographic lamp having a main reflector and a back-reflector which are located respectively behind and in front of a light source, in which the light exit aperture of the main reflector is closed by a diffuser screen.

For studio flashlights, large surface lamps are often used which use, as their light source, a flash tube which is located in front of the main reflector and behind the back-reflector. The back-reflector is an aluminum sheet which is partially curved spherically around the light source. The light source is arranged in such a manner that its light rays initially hit the main reflector and are reflected in a prespecified angle to the front. Light emerging immediately in front of the light source is initially reflected back onto the main reflector by the back-reflector so that these rays are also subjected to the desired change in direction by the main reflector. In order to obtain an even light source for photographing shiny objects, the diffuser screen, formed for example by a foil, which terminates at the main reflector at the front is arranged in front of the back-reflector.

This known lamp has the disadvantage that a more or less dark area is produced behind the back-reflector in the center of the diffuser screen in front of the light source. It can have a very disturbing effect in certain photographs, for example if the light source is reflected by the object to be photographed.

SUMMARY OF THE INVENTION

The invention has the object of designing a lamp of this type in such a fashion that the dark area on the diffuser screen is avoided.

This object is achieved according to the invention in the following manner. As a result of the design, according to the invention, of the back-reflector, it is possible for the light rays to be reflected back from the back-reflector to the main reflector with great intensity. Meanwhile, as a result of an only partly reflecting layer, the light rays also pass through the transparent base and hit the diffuser screen. Dark areas on the diffuser screen, which, in the case of known lamps, are produced by the opaque back-reflector, are thereby avoided. The lamp displays an extensively even illumination over its entire surface. In one embodiment the back-reflector advantageously comprises a glass plate on which the reflecting layer forms a type of graduated filter. This is achieved because the reflecting points, such as dots, spots or the like, of the layer increase in number towards the center of the base and become less frequent toward the periphery of the base. The light produced is thereby extremely even and the illumination is thus very even.

BRIEF DESCRIPTION OF THE DRAWINGS

FIG. 1 shows a cross-section and schematic representation of a photographic lamp according to the invention.

FIG. 2 shows a schematic representation of a back-reflector of the lamp according to FIG. 1.

DETAILED DESCRIPTION OF THE PREFERRED EMBODIMENTS

The invention is described below in further detail with reference to an exemplary embodiment represented in the drawing, in which the lamp 1 possesses a light source 2 which is preferably formed by a flash tube. This light source is surrounded at the back of the lamp by a main reflector 3 which has a large radius of curvature, and is curved, for example, parabolically, or in any other form. At the front side of the lamp, the main reflector 3 limits the light exit aperture 4, which is closed with a diffuser screen 5, preferably a foil. A back-reflector 6 is located between the light source 2 and the diffuser screen 5. The back-reflector 6 is preferably positioned closer to the light source 2 than to the diffuser screen 5. Light emerging directly from the light source 2 is reflected back onto the main reflector by the back-reflector 6 so that these rays can also be subjected to the directional action of the main reflector. Light reflections are further evened out with the diffuser screen 5 for photographing shiny objects.

The back-reflector 6 comprises a transparent glass plate which forms a base 7 which is provided with a reflecting layer (FIG. 2). However, the base 7 can alternatively comprise another transparent material and can also be curved. The reflecting layer 8 can be provided on both sides of the base. This layer preferably comprises a thermally stable colored coating. The reflecting layer 8 is applied to the back-reflector with varying density and preferably in the form of dots and/or spots. The density of the reflecting layer 8 is at its greatest in the center of the base 7 immediately in front of the light source 2 and decreases from there to the periphery 9 of the base. The base 7, with the reflecting layer 8, thereby forms a type of graduated filter whose characteristics are designed to be inverse to the radiation intensity of the incident light, that is to say the density of the reflecting layer 8 is proportional to the intensity of the incident light.

This back-reflector ensures even light production and an extremely even illumination, over the entire surface of the lamp, of the object to be imaged, so that no dark areas can arise on the diffuser screen.

What is claimed is:

1. A photographic lamp comprising:
   (a) a light source;
   (b) a main reflector located behind said light source with an exit aperture defined at the front end of said reflector;
   (c) a back-reflector located in front of said light source; and
   a diffuser screen covering the exit aperture of said main reflector, wherein said back-reflector comprises a light transparent base which is partly provided with a reflecting layer, said layer being applied with varying density onto said transparent base.

2. The lamp as claimed in claim 1, wherein the density of said reflecting layer is at its greatest in the center of said back-reflector directly in front of said light source and said density decreases towards the periphery of said transparent base in the manner of a graduated filter.

3. The lamp as claimed in claim 1, wherein said reflecting layer comprises a thermally stable colored coating.

4. The lamp as claimed in claim 1, wherein said transparent base is a plate.

5. The lamp as claimed in claim 1, wherein said transparent base is made of glass.

6. The lamp as claimed in claim 2, wherein said transparent base is a plate.

7. A photographic lamp comprising:

(a) a light source;
(b) a main reflector located behind said light source with an exit aperture defined at the front end of said reflector;
(c) a back-reflector located in front of said light source, and
(d) a diffuser screen covering the exit aperture of said main reflector, wherein said back-reflector comprises a light transparent base which is partly provided with a reflecting layer, the density of said reflecting layer being proportional to the intensity of the incident light.

8. A photographic lamp comprising:
(a) a light source;
(b) a main reflector located behind said light source with an exit aperture defined at the front end of said reflector;
(c) a back-reflector located in front of said light source, and
a diffuser screen covering the exit aperture of said main reflector, wherein said back-reflector comprises a light transparent base which is partly provided with a reflecting layer, said reflecting layer being applied in the form of dots and/or spots.

9. A photographic lamp of the type having a back-reflector and a diffuser screen, comprising:
(a) a light source;
(b) a main reflector located behind said light source, said main reflector defining an exit aperture at the front thereof;
(c) a back-reflector located in front of said light source, said back-reflector comprising a light-transparent base which is provided over at least one surface thereof with a reflecting layer, and
(d) a diffuser screen in front of said back-reflector and covering said exit aperture,
whereby light from said light source is both reflected back from said back-reflector to said main reflector and is passed through said transparent base; the result being that said diffuser screen is evenly illuminated and dark areas on the diffuser screen are eliminated.

10. The lamp as claimed in claim 9, wherein said reflecting layer comprises a thermally stable coating, the density of said coating being the greatest in the center of said back-reflector.

11. The lamp as claimed in claim 9, wherein said transparent base is made of glass.

12. The lamp as claimed in claim 9, wherein said transparent base is a plate.

* * * * *